United States Patent [19]

Sokolow

[11] 4,117,955

[45] Oct. 3, 1978

[54] MULTI-PORT VALVED NOZZLE FOR CO-INJECTION MOLDING

[75] Inventor: Nickolas N. Sokolow, Cheshire, Mass.

[73] Assignee: Beloit Corporation, Beloit, Wis.

[21] Appl. No.: 787,301

[22] Filed: Apr. 13, 1977

[51] Int. Cl.² .................. B29D 9/00; B29F 1/03
[52] U.S. Cl. .................. 222/144.5; 137/625.4; 222/509; 222/559; 239/415; 239/416; 425/130; 425/817 R
[58] Field of Search .............. 239/415, 416; 425/130, 425/131.1, 133.1, 562, 4 R, 132, 817 R; 137/625.4; 222/129, 144.5, 145, 509, 514, 559, 132

[56] References Cited

U.S. PATENT DOCUMENTS

| 3,912,133 | 10/1975 | Hehl | 222/509 X |
| 3,972,664 | 8/1976 | Fillmann | 425/130 |
| 3,976,226 | 8/1976 | Monnet | 222/145 |

FOREIGN PATENT DOCUMENTS

| 2,557,718 | 7/1976 | Fed. Rep. of Germany | 425/133.1 |
| 1,304,911 | 1/1973 | United Kingdom | 239/416 |

Primary Examiner—David A. Scherbel

[57] ABSTRACT

A valve controlled multiple port nozzle device is provided for co-injection molding to sequentially and simultaneously feed a plurality of plastics material melts into a mold. The nozzle device is especially adapted for initially feeding a skin melt followed by a simultaneous feeding of the skin melt and core or foamed melt and then followed by a final skin melt feed into a mold for producing a molded article with a core surrounded by a complete skin. The nozzle device has a single needle or pin valve controlling flow through the nozzle orifice and sequentially opening the orifice to flow from two inlet ports. The needle or pin has a blind bore selectively communicating with one of the ports as it is retracted from the nozzle orifice and spacers are provided to vary the gap between the needle valve tip and the orifice relative to the opening of the blind bore to its port.

18 Claims, 5 Drawing Figures

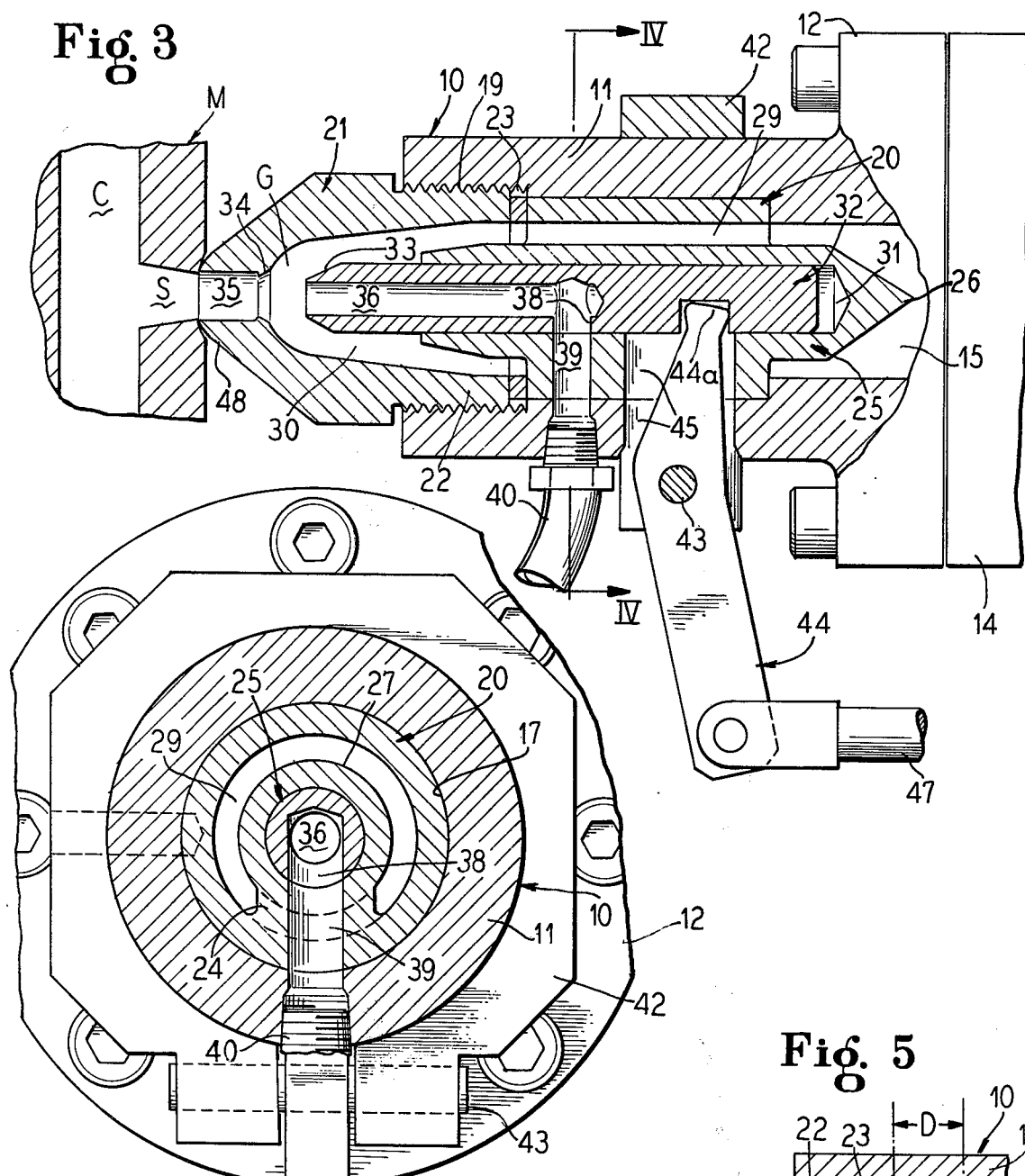
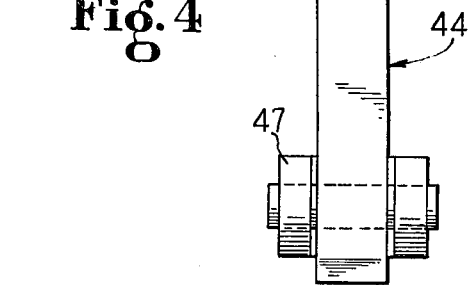
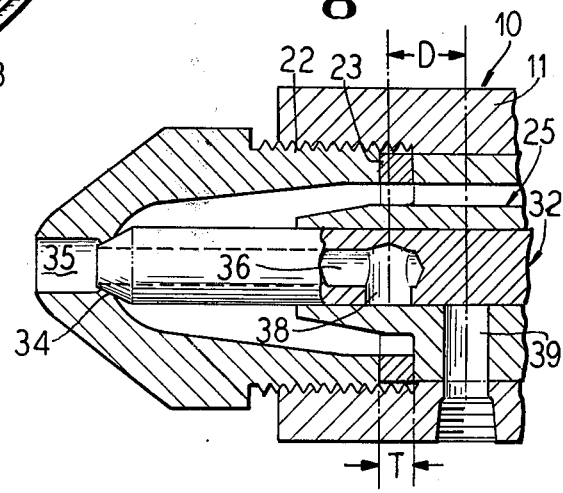

MULTI-PORT VALVED NOZZLE FOR CO-INJECTION MOLDING

FIELD OF THE INVENTION

This invention relates to the art of valved nozzles controlling flow from a plurality of ports and particularly deals with multi-port valved nozzles for co-injection molding to produce molded plastics articles having a foamed core surrounded by an unfoamed skin of uniform thickness.

The Prior Art

Feed devices for molding are known, for example, in the Fillmann U.S. Pat. No. 3,972,664 issued Aug. 3, 1976. These devices include a nozzle controlled by a needle valve telescoped in a sleeve valve each of which are separately actuated with the sleeve valve cooperating with the nozzle to form a ring orifice for the core melt and the needle valve cooperating with the sleeve valve to inject skin melt into the core melt for sandwich molding.

SUMMARY OF THIS INVENTION

The present invention now provides a valved nozzle control device for co-injection molding which has only a single movable valve member controlling skin and core melt flow through the nozzle orifice. The valve member is a needle or pin slidably mounted in a stationary sleeve which in turn is surrounded by a nozzle head and receives the skin melt material therearound while a port in the sleeve for the core melt is selectively opened and closed by the needle valve. The needle valve has a pointed end coacting with a seat in the nozzle orifice to control flow of the skin melt through the orifice and has a longitudinal bore communicating with the sleeve port and opening through the pointed end to flow the core melt through the pointed end into the center of the nozzle orifice.

A single trigger mechanism reciprocates the needle or pin in the sleeve toward and away from the nozzle seat and in so doing also closes and opens a second port. As the trigger retracts the pointed end of the needle away from the nozzle seat, the skin melt surrounding the sleeve and needle will flow through the nozzle orifice. As retraction continues, the core melt port in the sleeve will register with the bore in the needle to flow the core melt into the center of the nozzle orifice for co-injection into a mold with the skin melt.

The nozzle can be adjusted to move its seat toward and away from the sleeve in the housing or injection head to vary the spacing of the nozzle seat and the second port. Then as the needle is retracted, the gap between the nozzle seat and pointed end of the needle can be increased or decreased before the core melt port in the sleeve is opened to the bore of the needle. Thus, the rate of skin melt feed through the nozzle orifice prior to opening of the core melt port to the orifice is controlled. The relative rates of flow through the nozzle orifice of the skin melt and core melt are thus also controlled during the co-injection of both melts.

It is then an object of this invention to simplify multi-port nozzles for co-injection molding.

A further object of this invention is to eliminate the necessity for separate movable valves controlling the flow of core and skin melts through an injection nozzle.

A further object of this invention is to provide a multi-port fed nozzle with a single movable valve controlling the flow through the nozzle from the ports.

A specific object of the invention is to provide a needle valve control nozzle where the nozzle orifice receives flow from a second port through the needle of the valve.

A still further object of the invention is to provide a feed control for co-injection molding apparatus having a trigger driven pin selectively controlling flow through the nozzle from a plurality of separate ports.

Another object of the invention is to provide a nozzle for co-injection molding where a single pin opens and closes a port for core melt material and controls the rate of flow of skin melt material through the nozzle orifice around the core melt material.

Other and further objects of this invention will become apparent to those skilled in this art from the following detailed description of the annexed sheets of drawings which, by way of a preferred example, illustrate one embodiment of the invention.

ON THE DRAWINGS

FIG. 3 is a view similar to FIGS. 1 and 2 but showing the assembly in a fully opened position to coinject both skin melt and core melt into the mold;

FIG. 4 is a transverse cross sectional view along the lines IV—IV of FIG. 3;

FIG. 5 is a fragmentary longitudinal cross sectional view of the nozzle end of the assembly of FIGS. 1-3 showing the manner in which the nozzle is adjusted relative to the sleeve for varying the gap between the pointed end of the neddle relative to the registering of the needle bore with the sleeve port.

AS SHOWN ON THE DRAWINGS

Figure 1:
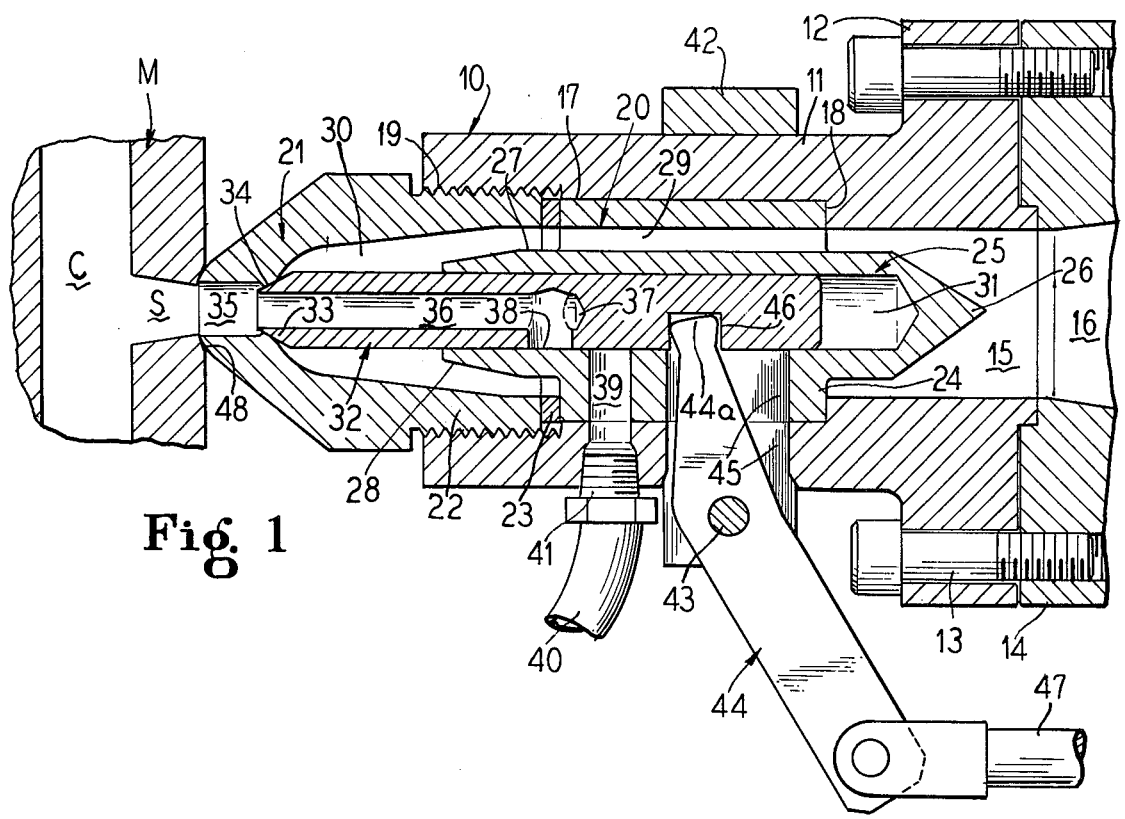
FIG. 1 is a longitudinal cross sectional view of a nozzle assembly according to this invention, in a fully closed position with the nozzle nose pressed against the sprue opening of a mold to form a thermo-plastic molded article with a foamed core surrounded by an unfoamed skin.

The nozzle assembly 10 of FIGS. 1-4 has a tubular housing or head 11 with a base flange 12 receiving a ring of bolts 13 therethrough to mount the assembly 10 tightly against the end face of an injection molding head 14 of a plastics molding machine. The housing 10 has a bore 15 therethrough registering with the feed port 16 of the injection head 14. The bore 15 has an enlarged counterbore 17, a shoulder 18 is provided at the inner end of the counterbore, and internal threads 19 are provided at the outer end of the counterbore.

A sleeve 20 is seated in the counterbore 17 and bottomed against the shoulder 18. A nozzle head 21 has an externally threaded tubular portion 22 screwed into the threads 19 and bottomed against a washer 23 seated against the sleeve 20. The sleeve 20 is thus clamped in the counterbore 17 between the shoulder 18 and the nozzle head 21.

The sleeve 20 has an internal radial neck 24 carrying an inner sleeve 25 concentrically within the sleeve 20 and extending byeond both ends of the sleeve 20. This inner sleeve 25 has a closed pointed end 26 in the center of the bore 15, a cylindrical outer periphery 27 through the sleeve 20 and a tapered front end or nose 28 projecting into the tubular portion 22 of the nozzle 21. An annular passage 29, blocked only by the local neck portion 24 is thus provided around the inner sleeve 25 connecting the bore 15 with the interior 30 of the nozzle 21. Flow of molten thermo-plastics material from the injection head 14 is thus freely provided by a through passage connecting the port 16 with the interior 30 of the nozzle 21.

The inner sleeve 25 has a cylindrical bore 31 extending longitudinally therethrough, closed at the pointed end 26 of the sleeve but extending through the opposite front end of the sleeve. A cylindrical pin or needle 32 is slidably mounted in this bore 31 and projects therefrom through the open front end of the bore into the interior 30 of the nozzle 21. This pin or needle 32 has a pointed leading end 33 coacting with a tapered seat 34 at the inner end of the nozzle orifice 35. The front end of the pin or needle 32 has a coaxial bore 36 opening through the pointed end 33 and extending to a blind inner end 37. A radial bore 38 through the pin 32 communicates with the blind end of the bore 36.

A radial port 39 is formed through the sleeve 20, the neck 24, and the inner sleeve 25 to register with the bore 31 in the inner sleeve and to be selectively closed by the pin or needle 32 or registered with the radial bore 38 in the pin or needle. This port 39 is fed with molten thermo-plastics material through a tube 40 which has a fitting 41 threaded into the tubular housing 11 at the port 39.

A split clamp 42 surrounds the tubular housing 11 just rearwardly of the port 39 and a pin 43 extending across the split of the clamp 42 provides a pivot support for a trigger finger 44. The housing 11 and the neck 24 of the sleeve 20 have registering slots 45 therethrough receiving one end of the finger 44 freely therethrough. This end of the finger has a rounded nose 44a seated in a slot 46 of the pin or needle 32 behind the blind end 37 of the bore 36. The opposite end of the finger 44 is pinned to the piston rod 47 of an actuating cylinder (not shown).

Swinging of the trigger finger 44 about the pivot pin 43 will thus reciprocate the pin 32 in the bore 31.

The nozzle 21 has a rounded nose 48 adapted to be pressed against mold M to register the nozzle orifice 35 with the mold sprue S to inject thermo-plastic molding material into the mold cavity C for forming a molded plastics article. The sprue and mold cavity selectively receive different types of plastics melts from the injection head port 16 and the tube 40 under the full control of the nozzle assembly 10 of this invention.

In the closed position of the assembly 10 as shown in FIG. 1, the nozzle orifice 35 is sealed from the injection head port 16 by the pointed end 33 of the pin 32 being fully seated against the orifice seat 34. In this position of the pin 32, the radial bore 38 is offset forwardly from the port 39 and the pin thus also seals the port 39 preventing flow of plastics material from the tube 40.

Figure 2:
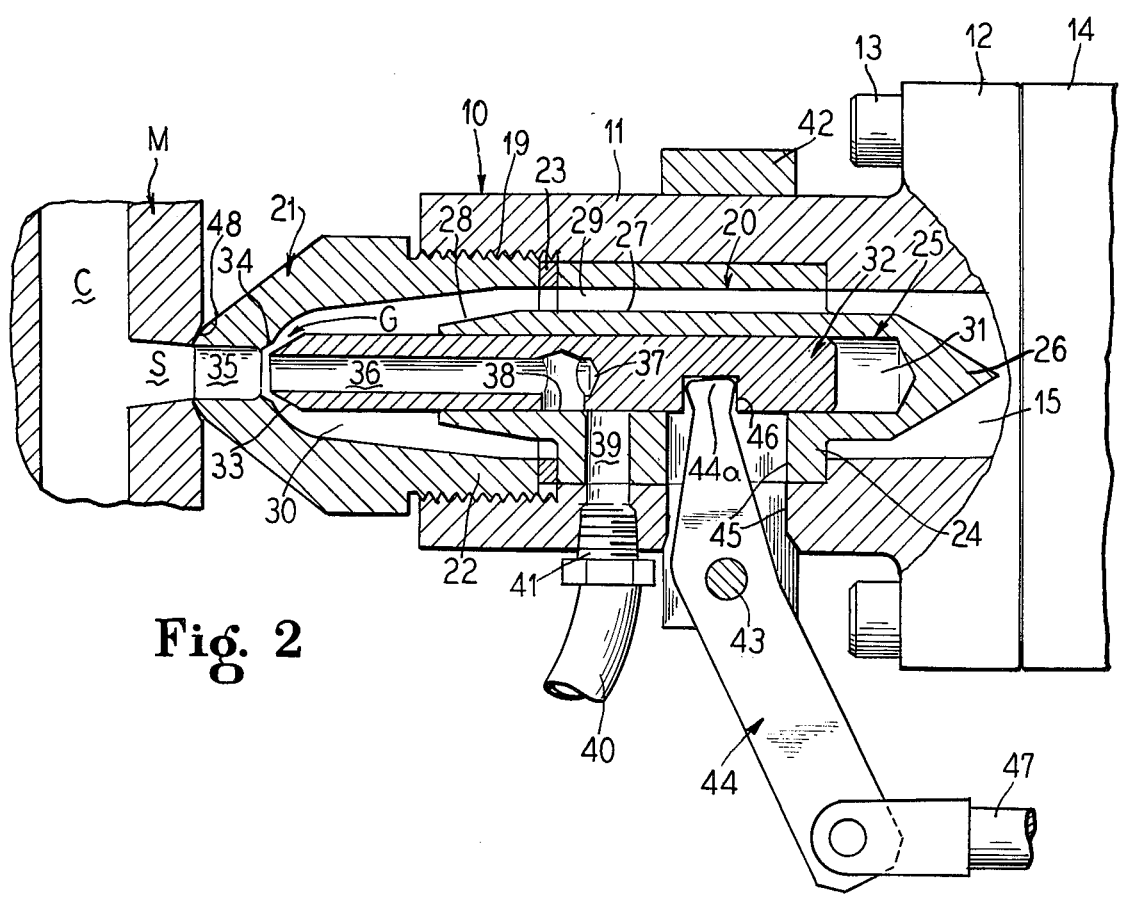
FIG. 2 is a view similar to FIG. 1 but showing the assembly in partially opened condition to feed skin melt only to the mold.

As the piston rod 47 is shifted to the left, the trigger finger 44 is swung about the pivot pin 43 to retract the pin or needle 32 into the bore 33 of the inner sleeve 25 thereby unseating the pointed end of the needle 33 from the seat 34 and opening the nozzle orifice 35 as shown in FIG. 2 to the first port 15 for flow of molten thermo-plastics material from the injection head 14 through an annular gap G, the width of which is controlled by the spacing of the pointed end 33 of the needle 32 from the seat 34. In the position of FIG. 2, the trigger finger 44 has not yet retracted the pin 32 sufficiently to bring the radial bore 38 of the pin into registration with the port 39 and the nozzle 35 will receive only thermo-plastics material from the one port 5.

As the piston rod 47 is projected further to the left to the position of FIG. 3, the trigger 44 will further retract the pin 32 to the blind end of the bore 31 in the inner sleeve 25 and the gap G will be widened to increase flow from the port 15 to the nozzle orifice 35. In addition, however, the radial bore 38 in the pin 32 will be brought into registration with the port 39 thereby also opening the tube 40 for flow of the second thermo-plastics molten material through the bore 36 of the pin 32 and into the center of the gap G for coinjection with the plastics material from the port 15 through the nozzle orifice 35. It will, of course, be understood that between the positions of FIGS. 2 and 3, the port 39 is partially opened as the gap G is widened so that the flow rate of the two plastics melts can be controlled.

In addition, according to this invention, the relative flow rates of the two plastics melts can be regulated and the sequence of flow can be varied by varying the space of the nozzle seat 34 from the port 39 so as to vary the amount of projection of the pin 32 from the sleeve 25 that is required to seat the pointed end of the pin on the nozzle seat. This is easily accomplished by increasing or decreasing the width of the washer 23 interposed between the end of the outer sleeve 20 and the inner end of the nozzle portion 22.

Thus, as shown in FIG. 5, the distance "D" which the pin 32 must be retracted from its closed position against the nozzle seat 34 before the port 39 is opened to the bore 38 and thus to the longitudinal passage 36 can be varied by varying the thickness T of the washer 23. A thin washer 23 will position the seat 34 closer to the port 39 and the front open end of the inner sleeve 25 and decrease the distance "D" which the pin 32 must be retracted from the seat 34 before the port 39 is opened to the bore 38. Conversely, a thicker washer 23 will space the seat 34 further away from the port 39 and sleeve 25 requiring the pin 32 to be projected a greater distance before seating and thus increasing the distance "D" required for retraction of the pin before the port 39 is opened.

The relative spacing of the orifice seat 34 from the front end of the inner sleeve 25 or from the position of the port 39 can be varied in any other suitable manner than by the use of washers.

Conventional heaters (not shown) can be provided around the housing 11 and nozzle head 21 to keep the thermo-plastic core and skin melts in a free flowing condition.

From the above descriptions, it will thus be clearly understood that this invention now provides a nozzle assembly which sequentially feeds fluids, especially molten thermo-plastics materials, from a plurality of ports and controls the rates of feeding and the sequence of feeding. The nozzles of this invention are especially useful in co-injection molding where a molten thermo-plastic skin melt is first injected into the mold, a molten thermo-plastic foamed core melt is then coinjected into the center of the sprue of the mold with the skin melt surrounding the core melt, and the injection is finished with the skin melt alone.

I claim as my invention:

1. A nozzle assembly comprising a tubular head having a first passage for a first material, a second passage for a second material, a single outlet nozzle having an orifice for both said first and second passages, a single pin cooperating with said nozzle to close the nozzle orifice and to sequentially open the orifice to said first and second passages, said tubular head having a flange on one end thereof adapted to be bolted to a mounting, a port opened and closed by said pin for selectively joining the second passage with the nozzle, and said nozzle being adjustable on said head toward and away from said port to vary the sequential opening of the nozzle to said first and second passages.

2. The nozzle assembly of claim 1, wherein said pin is coaxial with said first passage, is surrounded by said first passage, and has a coaxial bore selectively registering with said second passage.

3. The nozzle assembly of claim 1, wherein said head has an inner sleeve coaxial with said first passage and said pin is slidably mounted in said sleeve.

4. The nozzle assembly of claim 3, wherein said sleeve has a radial port to said second passage which is opened and closed by said pin.

5. The nozzle assembly of claim 1, including means for feeding a skin melt plastics material to said first passage and a core melt plastics material to said second passage with the skin melt material surrounding the core melt material flowing through the nozzle orifice.

6. A multiple port nozzle assembly adapted for co-injection plastics molding which comprises an injection head having a plastics material flow passage therethrough, a nozzle at the discharge end of said passage, a first inlet port communicating with said passage, a sleeve fixedly mounted in said head lying lengthwise in the central portion of said passage adapted to receive plastics material from said first port therearound, a second inlet port in said sleeve, a valve pin slidable in said sleeve and projecting therefrom to a tip end cooperating with said nozzle to control flow from said passage through said nozzle, said pin having a longitudinal blind bore opening through the tip thereof and a radial bore communicating with said sleeve adapted to register with said second port, and means shifting said pin in said sleeve toward and away from said nozzle to selectively close the nozzle and second port and to sequentially open the nozzle to the passage for flow of material from the first inlet port through the passage and through the nozzle and to then open the second port to flow material from the second port through the pin and into the center of the material flowing from the first port through the nozzle to simultaneous eject materials from both ports through the nozzle with the material of the first port surrounding the material from the second port.

7. The multiple port nozzle of claim 6, wherein the nozzle and second port are adjustably spaced to vary the sequence and rates of flow through the nozzle from the first and second ports.

8. The nozzle assembly of claim 6, wherein the sleeve has a radial neck mounting the sleeve in the head and defining the second port.

9. The nozzle assembly of claim 6, including means for variably spacing the nozzle and the second port to vary the relative rates of flow of the plastics materials through the nozzle.

10. The nozzle assembly of claim 6, wherein the means shifting the pin is a trigger pivoted on the head and having a free end engaging the pin to shift the pin as the trigger is pivoted.

11. The nozzle assembly of claim 6, wherein the nozzle has a seat selectively receiving the tip end of the pin.

12. An assembly for selectively controlling discharge from a plurality of ports comprising a housing having a through passage from a first port, a nozzle on the housing communicating with said through passage, a hollow valve in said housing communicating with a second port in the housing, said nozzle having a seat for said valve, means for sliding said valve toward and away from said seat to sequentially open the nozzle to said through passage and to open the second port through the hollow valve for flow of material from the second port with material from the through passage through the nozzle, and said housing having a tubular body with a flanged end adapted to be secured to a molding machine injection head.

13. The assembly of claim 12, wherein the single valve member is a pin.

14. The assembly of claim 12, wherein the nozzle is bottomed on a washer of selected thickness to vary the spacing of the nozzle seat and second port.

15. The assembly of claim 14, wherein the nozzle is threaded into the housing against the washer.

16. The assembly of claim 12, wherein the hollow valve is a needle valve, has a blind coaxial bore opening through the tip end thereof and opening to a radial bore at the blind end thereof which radial bore selectively registers with said second port.

17. The assembly of claim 16, including a trigger finger pivoted on the housing driving said needle valve toward and away from said nozzle seat.

18. A nozzle assembly comprising a tubular head having a first passage for a first material, a second passage for a second material, a single outlet nozzle having a orifice for both said first and second passages, a single pin cooperating with said nozzle to close the nozzle orifice and to sequentially open the orifice to said first and second passages, said tubular head having a flange on one end thereof adapted to be bolted to a mounting, a sleeve clamped in said tubular head between said nozzle and the flange end of said head, and a concentric inner sleeve supported in said clamped sleeve slidably mounting said pin.

* * * * *